US009135310B2

(12) United States Patent
Shamgunov et al.

(10) Patent No.: US 9,135,310 B2
(45) Date of Patent: Sep. 15, 2015

(54) QUERY ROUTING IN A DISTRIBUTED DATABASE SYSTEM

(71) Applicants: Nikita Shamgunov, San Francisco, CA (US); Ankur Goyal, San Francisco, CA (US); Alex Skidanov, San Francisco, CA (US)

(72) Inventors: Nikita Shamgunov, San Francisco, CA (US); Ankur Goyal, San Francisco, CA (US); Alex Skidanov, San Francisco, CA (US)

(73) Assignee: MemSQL, Inc., San Francisco, CA (US)

( * ) Notice: Subject to any disclaimer, the term of this patent is extended or adjusted under 35 U.S.C. 154(b) by 191 days.

(21) Appl. No.: 13/754,411

(22) Filed: Jan. 30, 2013

(65) Prior Publication Data

US 2013/0198232 A1 Aug. 1, 2013

Related U.S. Application Data

(60) Provisional application No. 61/592,440, filed on Jan. 30, 2012, provisional application No. 61/592,446, filed on Jan. 30, 2012, provisional application No. 61/592,453, filed on Jan. 30, 2012.

(51) Int. Cl.
*G06F 7/00* (2006.01)
*G06F 17/30* (2006.01)

(52) U.S. Cl.
CPC ................................ *G06F 17/30545* (2013.01)

(58) Field of Classification Search
CPC .................... G06F 17/30395; G06F 17/30967
USPC .................................................. 707/770, 779
See application file for complete search history.

(56) References Cited

U.S. PATENT DOCUMENTS

| | | | | |
|---|---|---|---|---|
| 5,875,334 | A * | 2/1999 | Chow et al. | 717/141 |
| 7,631,293 | B2 * | 12/2009 | Alcorn | 717/108 |
| 7,752,197 | B2 * | 7/2010 | Dettinger et al. | 707/721 |
| 2003/0187839 | A1 * | 10/2003 | Zhang et al. | 707/4 |
| 2005/0027701 | A1 * | 2/2005 | Zane et al. | 707/3 |
| 2006/0271557 | A1 * | 11/2006 | Harward et al. | 707/10 |
| 2009/0089312 | A1 * | 4/2009 | Chi et al. | 707/102 |

* cited by examiner

*Primary Examiner* — Cheyne D Ly
(74) *Attorney, Agent, or Firm* — Robert M. McDermott

(57) ABSTRACT

A distributed query system includes a distributed collection of dynamically created compiled queries. As each client submits a query, a parameterized query skeleton is identified, which identifies the general form of the query, and the parameters associated with the particular query. If a compiled form of the skeletal query is available within the distributed system, it is executed with the parameters of the current query. If the compiled form of the skeletal query is not available within the distributed system, a compiled form is created, and the location of this compiled skeletal query is stored for subsequent access by this client, or other clients. The executable compiled skeletal queries may be stored at each client system, in a commonly available server storage system, or within one or more database servers. A routing system may be provided to efficiently route parameterized queries to the appropriate location(s) of the compiled skeletal query.

28 Claims, 5 Drawing Sheets

310, 320

| QUERY | | SKELETAL QUERY FORM |
|---|---|---|
| Select * from stock where id in(1, 2, 3) | 315a | Select * from stock where id in(<@>) |
| | 315b | Select * from stock where **<C>** in(<@>) |
| | 315c | Select * from **<T>** where **<C>** in(<@>) |
| Select price from stock where id=5 | 325a | Select price from stock where id=<@> |
| | 325b | Select price from stock where id in(<@>) |
| | 325c | Select **<C1>** from stock where **<C2>**=<@> |
| | 325d | Select **<C1>** from **<T>** where **<C2>**=<@> |
| Select sum(price) from stock where id in(5,6,7) | 335a | Select sum(price) from stock where id in(<@>) |
| | 335b | Select sum(**<C1>**) from stock where **<C2>**in(<@>) |
| | 335c | Select **<F>**(**<C1>**) from stock where **<C2>**in(<@>) |
| | 335d | Select price from stock where id in(<@>) AS List; SUM (List) |

| SKELETON QUERY | | LOCATION |
|---|---|---|
| S1 KEY | S1 QUERY FORM | SC17 |
| S2 KEY | S2 QUERY FORM | SC23 |
| S3 KEY | S3 QUERY FORM | SS4 |
| ⋮ | ⋮ | ⋮ |
| Sn KEY | Sn QUERY FORM | SXx |

| | 910 | 920 / 921 / 922 | 930 | 940 | |
|---|---|---|---|---|---|
| | **Query Skeleton** | **K** | **Value Space** | **Data Server ID** | |
| 911 | S1, S2, S7, S19, S23 | ID | ID < 10000 | DS1 | 941a |
| | | | 10000 ≤ ID ≤ 20000 | DS2, DS3, DS4 | 941b |
| | | | ID > 20000 | DS5 | 941c |
| 912 | S5, S6, S9, S13 | St | Not "married" | DS6 | 942a |
| | | | "married" | DS7, DS8, DS9 | 942b |
| 913 | S3, S4, S8 | | null | DS7, DS8, DS9 | 943 |

QUERY ROUTING IN A DISTRIBUTED DATABASE SYSTEM

This application claims the benefit of U.S. Provisional Patent Applications 61/592,440, 61/592,446, and 61/592,453, each filed 30 Jan. 2012.

BACKGROUND AND SUMMARY OF THE INVENTION

This invention relates to the field of database searching, and in particular to a system and method that provides a distributed cache for managing database query plans.

As technologies advance, the amount of information that is being stored in electronic form is ever increasing. Correspondingly, the search for particular information becomes increasingly more time consuming, while, at the same time, the expectation for rapid response increases.

Database management systems (dbms) are designed to organize data in a form that facilitates efficient search and retrieval of select information. Typical database management systems allow a user to submit a 'query' for finding and retrieving information that satisfies the query. Although a natural language interpreter may be the goal for developers of database management systems, users are generally required to use a 'query language' to submit such queries. Often, the user's query is a sequence of queries that are sequentially applied, with each query providing an increasingly finer filter for finding the desired information.

In a typical database management system, a query language interpreter processes each query, creates computer executable code, executes the code, then proceeds to process the next query. Such interpretation, however, may consume a significant amount of time, and the code produced may not be efficient in execution time or memory usage. In a distributed database management system, wherein queries are processed on multiple servers, this potential inefficiency occurs on each of the servers.

Most queries are unique, in that they are typically generated to solve a particular problem, to locate a particular information item, to create a particular grouping of information, and so on. Accordingly, each query is generally processed independently of prior queries.

Some database management systems allow a user to identify queries that may be used frequently, so that the generated computer executable code can be stored for reuse as required. The user may, for example, assign a name or other identifier to a particular query, then refer to that query using this identifier in subsequent queries. When the interpreter recognizes the identifier, it retrieves the code that had been previously created, avoiding the time and resources required to re-generate this code.

In some embodiments of user-definable reusable queries, the user is also provided the option of 'parameterizing' the query so that it can be executed using different arguments as the situation demands. For example, if the user typically queries a database for records having a 'cost' parameter with a value above a particular threshold value, the user may identify the query as "CostThreshold", and identify the threshold value as an argument to this query. Thereafter, the user may submit a query such as "CostThreshold(100)" to find records having a cost value greater than 100. The identification and creation of such parameterized queries, however, typically require a level of expertise that may not be within the skill set of every user, or may not be considered by the user to be worth the time or trouble of creating such parameterized queries.

Even if the time savings provided by reusable code does not have a sufficient payback to warrant an individual user's time and effort to create the reusable code, the cumulative effect of having to regenerate the executable code for each query may be substantial, resulting in poor performance for all users, as the system spends more time regenerating code than in actually executing the code to satisfy each query.

It would be advantageous to reduce the time consumed in the execution of a user's query, or sequence of queries. It would also be advantageous to optimize the use of resources in the execution of such queries.

These advantages, and others, can be realized by a distributed collection of compiled programs. As each client submits a query, a parameterized query skeleton is identified, which identifies the general form of the query, and the parameters associated with the particular query. If a compiled form of the skeletal query is available within the distributed system, it is executed with the parameters of the query. If the compiled form of the skeletal query is not available within the distributed system, a compiled form is created, and the location of this compiled skeletal query is stored for subsequent access by this client, or other clients. The executable compiled skeletal queries may be stored at each client system, in a commonly available server storage system, or within one or more database servers. A routing system may be provided to efficiently route parameterized queries to the appropriate location(s) of the compiled skeletal query.

BRIEF DESCRIPTION OF THE DRAWINGS

The invention is explained in further detail, and by way of example, with reference to the accompanying drawings wherein:

FIG. 3 illustrates an example set of queries and corresponding parameterized skeletal queries.

FIG. 5 illustrates an example data structure for identifying the location of compiled skeletal queries corresponding to identified skeletal query forms.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

The example query processing system is presented using the paradigm of a query processor that overlays and interacts with an underlying conventional database management system. The query processor avails itself of functions and procedures provided by the conventional database management system, and generates executable code, also known as machine code, that interacts with these functions and procedures. One of skill in the art, however, will recognize that the inventive features presented herein may be included within the core of a database management system that adopts these features as included features.

Also, the example query processing system is presented using the paradigm of a database query system that processes queries that are formed using the operations and format of the standard Structured Query Language (SQL). One of skill in the art will recognize, however, that the principles of this invention may be applied for the processing of queries in other languages as well.

As noted above, in a common database query language, there are perhaps thousands of different forms of queries that may be submitted by a user, and conventional query language interpreters are configured to parse each query into a series of more primitive operations. The inventors have recognized, however, that any particular user of the query language is likely to use a limited subset of query forms, and as such, may often repetitively use the same form of a query, albeit with different parameters for each query, may apply the same query to different databases, and so on. In like manner, different users in the same organization, or different users of the same database, may use the same query forms, albeit with different parameters for each query.

Figure 1:
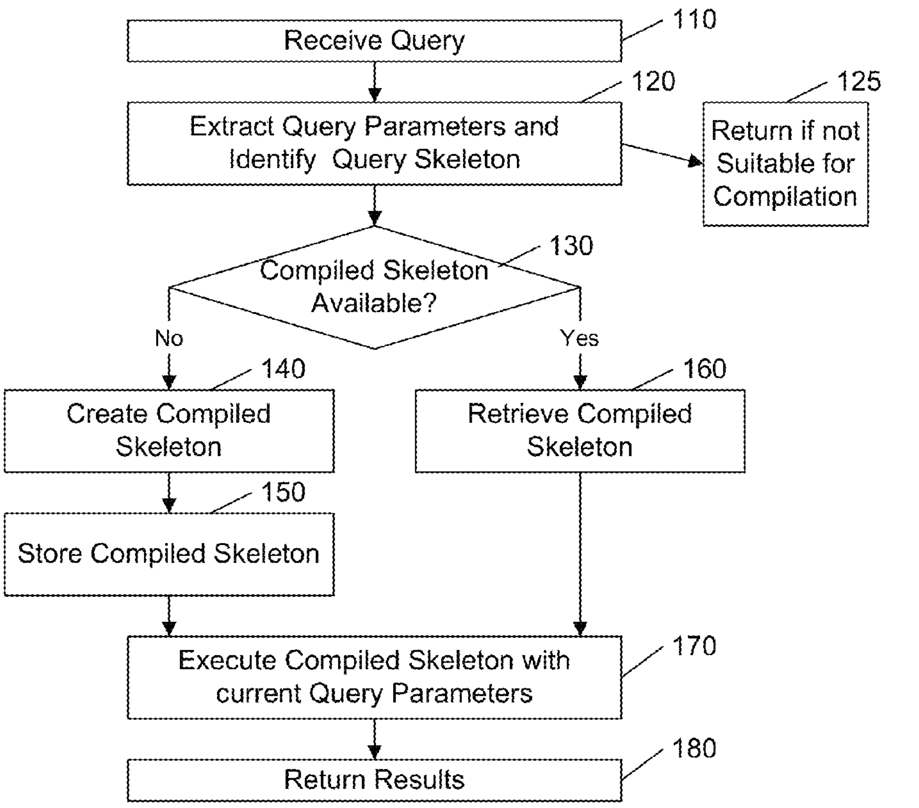
FIG. 1 illustrates an example flow diagram of a query processor in accordance with aspects of this invention.
Figure 2:
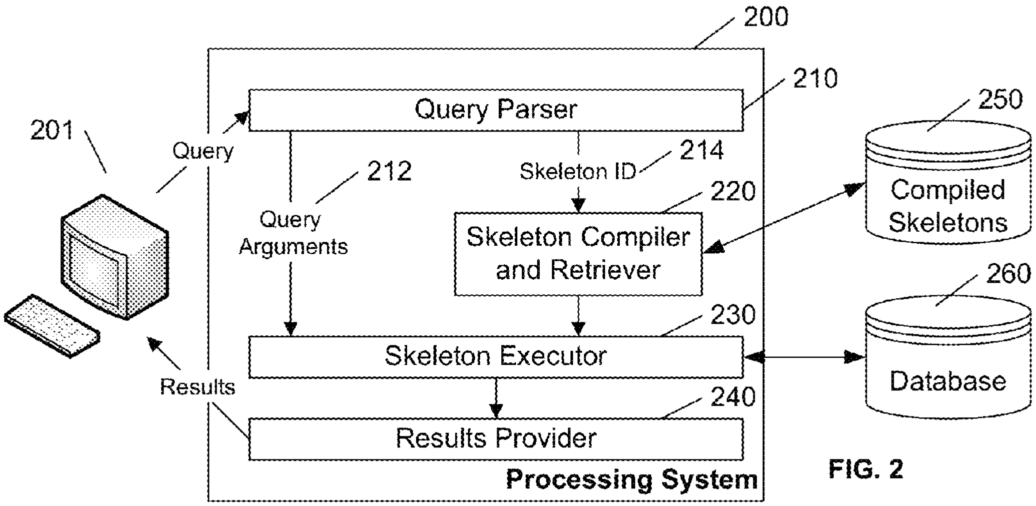
FIG. 2 illustrates an example block diagram of a query processing system that includes a collection of compiled skeletal queries.

Copending U.S. patent application Ser. No. 13/754,333, "REUSING EXISTING QUERY PLANS IN A DATABASE SYSTEM", filed Jan. 30, 2013 for Adam Prout, Marko Tintor, and Alex Skidanov, discloses a method and system for creating compiled parameterized skeletal queries, and is incorporated by reference herein. FIGS. 1-3 are copies of the figures of this copending application. This example embodiment assumes a single user system that compiles skeletal queries from a single user or single client.

FIG. 1 illustrates an example flow diagram of a query processor that identifies a parameterized skeletal query, creates and/or retrieves a compiled version of the skeletal query, then executes the query with the parameters of the current query.

Each query that is submitted by a user, at 110, is parsed to identify the form of the query, hereinafter termed the 'skeletal' form of the query, and the particular parameters associated with this query, at 120. If, at 130, a compiled version of this skeletal query is available, that compiled code is retrieved, at 160, and used to execute the query, at 170, using the parameters/arguments of the current query. If, at 130, a compiled form of the skeletal query does not yet exist, the current query may be compiled, at 140, stored for potential future use, at 150, and executed, at 170, using the parameters/arguments of the current query.

Consider, for example, two basic queries, such as "Select all records in tableA, with name equal to 'smith', 'jones', or 'brown'", and "Select all records in tableA, with name equal to 'adams', 'nagle', 'harris', or 'kelly'". In a conventional query processor, each of these queries would likely invoke the same set of computer instructions, with the exception that in the first query, a search will be conducted for each of the three match values of 'smith', 'jones', or 'brown', and in the second query, a search will be conducted for each of the four match values of 'adams', 'nagle', 'harris', or 'kelly'.

In an embodiment of this invention, a skeletal form of this basic query may be of the form "Select all record in tableA, with name equal to one of <list>". When a compiled version of this skeletal query is created, it may be created in a parameterized form, wherein the particular list of match values is encoded as an argument to the compiled query. The particular list of match values is provided to the compiled query when the compiled query is invoked ('called'). In like manner, a skeletal form of this basic query may also include the identifier of the column as an argument, such as "Select all record in tableA, with <column>equal to one of <list>".

Techniques for the compilation of queries are well known in the art, such as the technique disclosed in "Efficiently Compiling Efficient Query Plans for Modern Hardware", Thomas Neumann, Proceedings of the VLDB Endowment, Vol. 4, No. 9, pp. 539-550 (September 2011).

Although creating a compiled version of a single skeletal query may be more time and resource consuming than the conventional interpretation and decomposition of a query into a series of primitive operations, the potential savings in execution time using a compiled version of a query, and particularly, the potential savings in interpretation and execution time and resources when a compiled version is re-used, will generally provide for a substantial improvement in the overall execution of the user's queries.

It should be recognized that providing compiled versions of a query does not exclude the conventional use of un-compiled queries. If a particular query is deemed unsuitable for compilation, due to the complexity or uniqueness of the query, or a recognition that the conventional processing of this un-compiled query is sufficiently efficient, or other factors, the creation of a compiled version of the query may be bypassed, at 125.

FIG. 2 illustrates an example block diagram of a query processing system 200 that includes a collection of compiled skeletal queries 250. The query parser 210 is configured to receive and parse a query from a user terminal 201. In particular, the query parser 210 identifies parameters contained in the query based on the syntax of the particular query statement and other considerations. Upon identifying each parameter that will be extracted from the query to form a skeletal query, the resultant skeletal query is defined.

Any or all of the parameters of the query may be selected to be arguments in a skeletal query corresponding to the particular query. The choice of which parameters to select as dynamic arguments will often be dependent on the expected difficulty in creating a procedure that allows the parameter to be passed to the procedure, as compared to the generally less difficult task of including the parameter directly within the procedure. Including more parameters as arguments to the skeletal query allows that skeletal query to be potentially applicable to more queries than a skeletal query with built-in parameters, because the particular query in the latter case would have to have exactly the same value of these built-in parameters.

FIG. 3 illustrates an example set of user queries and corresponding sets of example parameterized skeletal queries.

The first query 310 is an SQL query that returns all of the records (rows) in the table "stock" that have a value of 1, 2, or 3 in the column "id". This query includes the SQL operational terms of: Select, From, and Where; and has parameters "*" (entire record), "stock", "id", and the match values of 1, 2, and 3.

A variety of skeletal queries 315*a*-315*c*, and others, may be defined from the user query 310, depending upon the particular features of the embodiment of the query parser 210 (of FIG. 2). Embodiments of the query parser 210 may parameterize each of the parameters "stock" (the particular table), "id" (the particular column within the table), and "1, 2, 3" (the particular value to be matched to the value in the identified column of the table).

A basic embodiment of the query processor may be configured to parameterize the values that are to be matched, as illustrated by the example query form 315*a*. The SQL operational terms "Select", "From", and "Where", and the parameters "*", "stock", and "id" are included as integral parts of the query form 315*a*, whereas the value parameters "1, 2, and 3" are represented by an argument "<@>". Given a compiled version of query form 315*a*, that compiled query can be used for any search of the stock table for records having particular id values, by passing the particular match values as arguments of the compiled query. To accommodate different sets of match values, including a different number of values included for matching, the value parameters may be passed to the compiled query as elements of a variable length list.

In a more complex embodiment, the query processor may be configured to also include the column to be searched as an argument in the query form, as illustrated by the "<C>" argument in the query form 315*b*. In a further embodiment of the query processor, the table to be searched may also be passed as an argument in the query form, as illustrated by the "<T>" argument in the query form 315*c*.

Query 320 includes an additional parameter "price" in the query. As contrast to the "*" parameter in query 310, which returns the entire record for all records that have the specified id value, query 320 will return only the value of the price entry in the record for all records that have the specified id value. Query 320 also includes a single value "5" that is to be matched with the value of id in the stock table.

In a basic embodiment of the query processor, this price parameter is included as an integral element in the skeletal query form, as illustrated in query form 325*a*. The particular value ("5") of the id parameter that is to be matched is included as an argument ("<@>") to the query form 325*a*, allowing this compiled query to find the price of any particular id value. FIG. 3 also illustrates alternative skeletal query forms 325*b*-325*d* that may be formed to satisfy query 320 in more complex embodiments of the query processor.

In like manner, FIG. 3 illustrates alternative query forms 335*a-d* that may be formed to satisfy query 330. Of particular note, query 330 includes a function "sum(price)". In the example skeletal forms 330*a-c*, this function is considered a parameter of the skeletal query form. Alternatively, recognizing that function operations are often performed after the records are selected, the query processor may be configured to partition a query that includes a function call to provide a result into a sequence of operations, such as an operation (query) that identifies the values that are to be provided to the function, followed by the operation of this function on these values, as illustrated by the example query form 335*d*. In this example, all of the prices in the table stock having an id matching an entry in the argument list "<@>" are returned in a list named "List", using the "Select . . . AS <name>" option. This returned list is then passed to a "SUM" function that provides a sum of the returned prices in List.

One of skill in the art will recognize that any particular embodiment of the query parser 210 of FIG. 2 will parse each user's query so as to produce a particular skeletal query with a potential combination of non-argumented parameters and argumented parameters (parameters that are passed as arguments to the skeletal query). For a user's query to be characterized as corresponding to a previously defined skeletal query, the form of the query must match the skeletal query with the defined operations and non-argumented parameters (hereinafter the skeletal query form), and provide parameters that can be passed to the skeletal query as arguments that are consistent with this particular skeletal query form. For example, a query parser 210 that identifies and generates the skeletal query of 315*a* will characterize a subsequent user query of the form "Select * from stock where id in ( . . . )" as a query that corresponds to the skeletal query 315*a* with defined operations "Select", "from", "where" and "in", and non-argumented parameters "*", "stock", and "id". The values within the parentheses following the "in" operation are the parameters that are passed as arguments ("<@>") to the compiled skeleton query corresponding to skeletal query 315*a*.

Returning to FIG. 2, the query parser 210 will provide an identifier 214 of the determined skeleton query, as well as the parameter values for each of the identified argumented parameters as query arguments 212 to the identified skeleton query. The identifier 214 of the determined skeleton query may be of the form identified in the skeleton query column of FIG. 3, wherein each database term (e.g. "select", "from", "where", "in") used in the query is identified, as well as the parameters that are not argumented, and an identification of the parameters that are expected to be passed as an argument to this skeletal query. Of particular note, all user queries of the same form (as defined by the query parser 210) will produce the same identifier 214, albeit with potentially different values of the query arguments 212.

The skeleton compiler and receiver 220 determines whether this identifier 214 matches any of prior identifiers received from the parser 210. If it does, the skeleton compiler and retriever 220 merely retrieves the compiled version of the skeletal query that was produced when the prior identifier was received and processed. If the identifier 214 of the skeletal query does not match one of the previously received and processed identifiers, the skeleton compiler and retriever 220 initiates a process that creates a procedure corresponding to the skeletal query and provides a compiled version of this procedure.

Depending upon the expected number of different skeletal queries, the skeleton compiler and retriever 220 may be configured to execute a search for a matching skeleton query form using any of a variety of well known techniques. In a simple embodiment, for example, each identified skeletal query may be stored with the communicated identifier 214, and each subsequent skeletal query will be compared, one by one, with each of the prior identifiers 214. In another fairly simple embodiment, the initial database command (e.g. "select") may be used to partition the skeleton queries into searchable subsets, within which the aforementioned search for matching identifiers 214 may be conducted. Similarly, secondary commands (e.g. "from databaseA") may be used to further partition the skeleton queries into searchable sub-subsets within which the search for matching identifiers 214 may be conducted.

In some embodiments, a hash value of one or more of the terms in the skeletal query form may be used to generate a unique value corresponding to each skeletal query form, or each skeletal query form within a subset. Each new skeletal query form is identified by a "null" value at a memory location identified by the hash value. As each new skeletal query is created, the value at the memory location identified by the hash value may indicate a location at which the compiled version of the skeleton query may be found. Conventional hash table techniques may be used to deal with potential duplicates of hash values.

For example, the value at the memory location corresponding to the hash value may point to the start of a linked list. Each entry of the linked list may include the full skeletal query form, the location where a compiled version of the skeletal query may be found, and a pointer (link) to the next table entry, if any, of another full skeletal query form that hashes to this same hash value. If the value at the memory location corresponding to the current hash value is not 'null', the current skeletal query form is compared to each of the full skeletal query forms in the linked list until a match is found. If a match is not found, the current skeletal query is compiled, and a new entry is added to the linked list associated with the hash value of the current skeletal query.

A skeleton executor 230 is configured to execute the compiled skeleton query to an identified database 260, using the current query arguments 212. A result provider 240 is configured to return the result of the query. In some embodiments, any post-processing functions or tasks may be included within the result provider 240. For example, if the count(*) function of query 310 was not included as an argument to the skeleton query, and otherwise not included in the compiled query that was executed at 230, the results provider 240 may be configured to count the number of records returned by the skeletal query code executed at 230. Alternatively, the results provider may merely return the selected records/rows based on the skeletal query, and rely on the underlying database management system to execute the count (*) function, where * is the returned records from the skeletal query.

Embodiments of this invention include a distributed collection of compiled queries that may be accessed by multiple clients.

Figure 4:
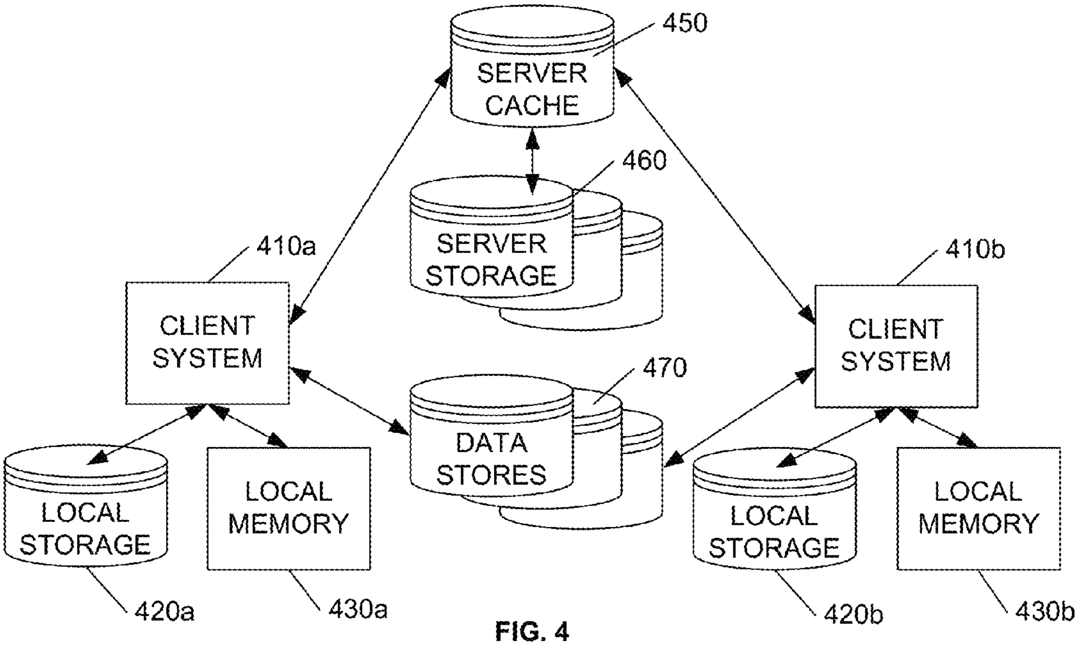
FIG. 4 illustrates an example block diagram of a distributed query system with skeletal cache.

FIG. 4 illustrates a block diagram of a first example embodiment of a distributed query system. In this example, two client systems 410*a*, 410*b* communicate with a server cache 450 to obtain compiled skeletal queries that facilitate access to data stores 470. One of skill in the art will recognize that the number of client systems and server caches may differ from this example embodiment.

As in the above example of a single client system, each client 410*a*, 410*b* includes local storage 420*a*, 420*b* for persistent storage of previously compiled queries, and local memory 430*a*, 430*b* into which these compiled queries may be loaded for execution by the client system 410*a*, 410*b*. When the client system 410*a*, 410*b*, executes the compiled query, using parameters that are specific to the particular query, the data stores 470 are accessed and the requested information is provided to the requesting client system 410*a*, 410*b*.

As contrast to the single client system of FIG. 2, the server cache 450 is configured to store other compiled skeletal queries at server storage 460. For example, as each client 410*a*, 410*b* creates a new compiled skeletal query, it may forward a copy to the server cache 450. Thereafter, each client 410*a*, 410*b* is able to retrieve and use a compiled skeletal query that was created by a different client.

Optionally, because the server storage 460 will include all of the compiled skeletal queries, regardless of origin, the use of local storage 420*a*, 420*b* at the client systems 410*a*, 410*b* may be optional. That is, some or all of the client systems may rely on retrieving all compiled skeletons from the server storage 460, via server cache 450.

Also, one of skill in the art will recognize that the use of a server cache 450 is also optional, in that the client systems 410*a*, 410*b* may be configured to access the server storage 460 directly. Preferably, the server cache 450 provides faster access to the compiled skeletons by keeping recently accessed, or frequently accessed, skeletons available at the cache 450, thereby avoiding the need to access the server storage 460, which is likely to have slower retrieval times.

FIG. 5 illustrates an example skeleton location table that may be used to facilitate access to stored skeletal queries at the server system 450-460 upon receipt of a request from a client 410. In this example, each compiled skeleton includes a description of the skeletal query 510, and a location 520 at which the compiled skeleton may be found.

When a client 410 submits a compiled skeleton to the server cache 450, it will include a description of the skeleton (the aforementioned skeletal query form of non-argumented parameters) and a description/list of the argumented parameters, which the server cache 450 may include as the skeletal query form 514 directly, or after some pre-processing for compatibility among clients. When a (different) client subsequently submits a request for a compiled skeleton having this skeletal query form, the server cache 450 initiates a search for a matching skeletal query form 514.

To facilitate the search for a matching skeletal query form, the server cache 450 may use one or more skeleton "keys" 512 that serve to reduce the range of the search or otherwise increase the speed of the search. For example, the skeletal queries may be ordered based on the order of query commands in the skeleton. Queries starting with "Select" may be grouped together, and within that grouping, are ordered based on the next command or parameter (e.g. "<F>", "*", etc.), with further sub-groups based on the subsequent commands or parameters. Given an ordered list of skeletal query keys 512, conventional search techniques may be applied to quickly determine whether a matching skeleton key 512 and corresponding matching skeleton query form 514 is located at the server system 450-460. If a match is found, the location field 520 identifies where the compiled version of the requested skeletal query form may be found.

Other ordering and search techniques will be apparent to one of skill in the art. For example, the skeletal query key 512 may be a hash value that is created from a hash of the skeletal query form 514, and conventional hash table techniques may be used to determine the location of the complied version of the skeletal query, as detailed above.

The location field 520 may identify a location in the skeletal cache 450, if the requested skeletal form has been recently accessed, or is frequently accessed, or a location in the skeletal storage 460. In an alternative embodiment, a location at the client storage 420 of the client that created the compiled skeleton may be cited for locating the compiled skeleton, reducing or eliminating the need for skeletal storage 460. That is, instead of submitting the compiled version to the storage cache 450, the client system 410 that creates the compiled version may merely submit the skeletal query form 514, and an identification of where the compiled version may be obtained from this client system 410. One of skill in the art will recognize that any of a variety of architectures may be used for dynamically storing and retrieving copies of compiled version of skeletal queries based on an identification of a corresponding skeletal query form, as detailed herein.

Figure 6:
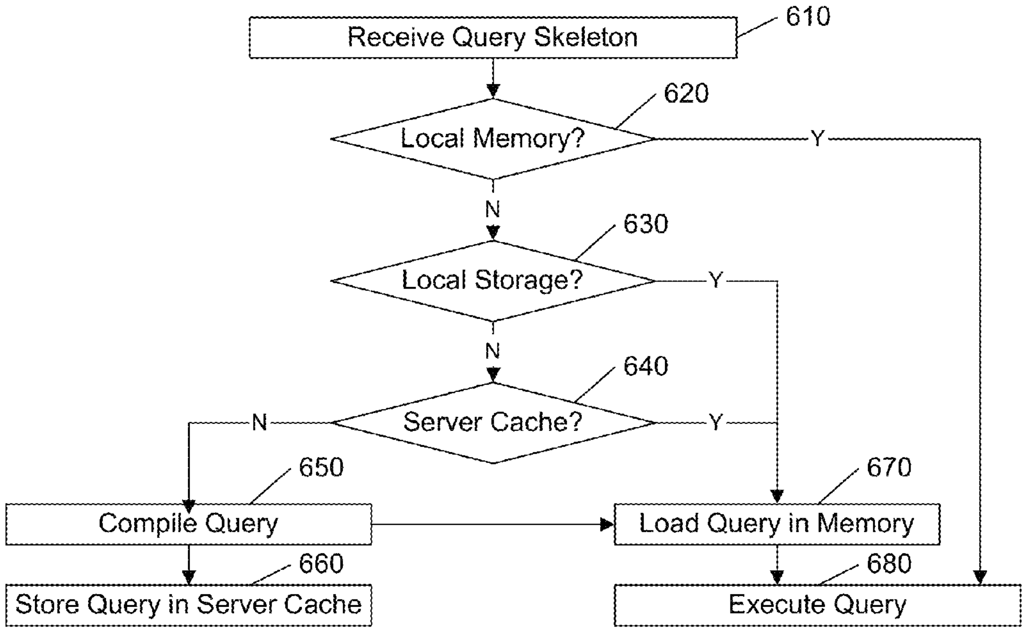
FIG. 6 illustrates an example flow diagram for locating and executing compiled skeletal queries corresponding to an identified skeletal query form.

FIG. 6 illustrates an example flow diagram for obtaining a compiled version of a skeletal query in a system wherein these compiled copies may be stored at the client's local memory or storage, or at a memory or storage that is accessible via a server.

At 610, upon receipt of a query, the query processing system identifies a skeletal query form corresponding to this query; the skeletal query form identifies the form of the query in terms of the non-argumented parameters/commands (parameters or commands embedded within the compiled query) and the argumented parameters (parameters passed as arguments to the compiled query), as detailed above.

If the compiled version of the skeletal query is already loaded with the executable code in the client's memory, at 620, it is executed with the parameters for this particular query, at 680. Otherwise, the client's local storage, if any, is searched for the compiled version of the skeletal query. If, at 630, the compiled version is found in the client's local storage, it is loaded with the executable code in the client's memory, at 670, then executed with the parameters for this particular query, at 680.

If the compiled version of the skeletal query is not available at the client, the client requests a copy of the compiled version from a server. If, at 640, the server is able to provide a compiled version of the skeletal query, it is loaded with the executable code in the client's memory, at 670, then executed with the parameters for this particular query, at 680.

If, at 640, a compiled version of the skeletal query is not available at the client or the server, the client creates a compiled version of the skeletal query using techniques common in the art, at 650. This compiled version is loaded with the executable code in the client's memory, at 670, then executed with the parameters for this particular query, at 680. Additionally, a copy of the compiled skeletal query is submitted to the server, at 660. This submission to the server may be scheduled as a 'background' task, so as not to interfere with the database querying operations. As noted above, the client may merely send the skeletal query form and a location at which to find the compiled version at the client storage, in lieu of sending the compiled version to the server.

Optionally, to reduce the required feature set at the client systems, the server may be configured to create the compiled versions of skeletal queries that are not yet available from the server. That is, step 650 of FIG. 6 may be performed by the server, rather than by the client that initiated the query. These and other variations on the processes used, or the sequence of processes will be evident to one of skill in the art in view of this disclosure.

Figure 7A:
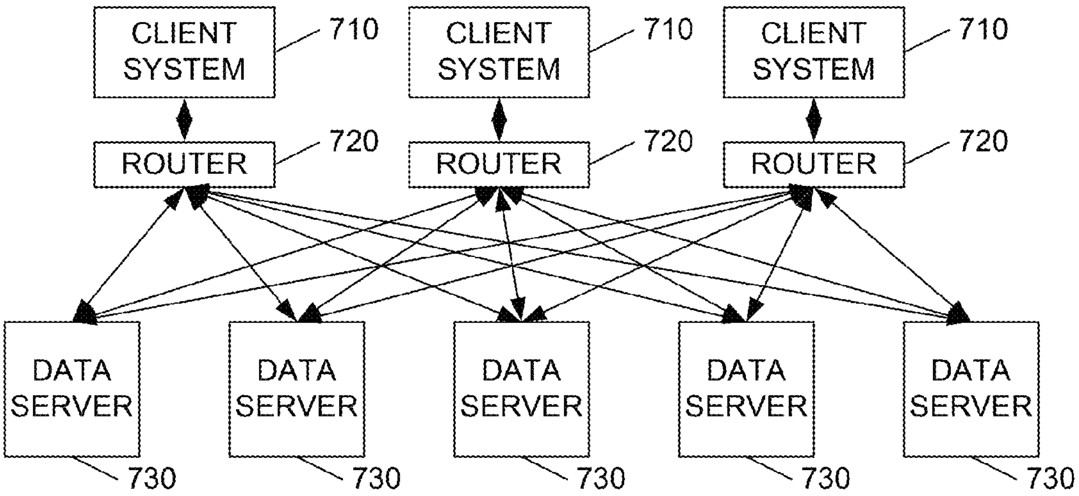
FIGS. 7A-7B illustrate example block diagrams of a distributed query system with multiple data servers.
Figure 7B:
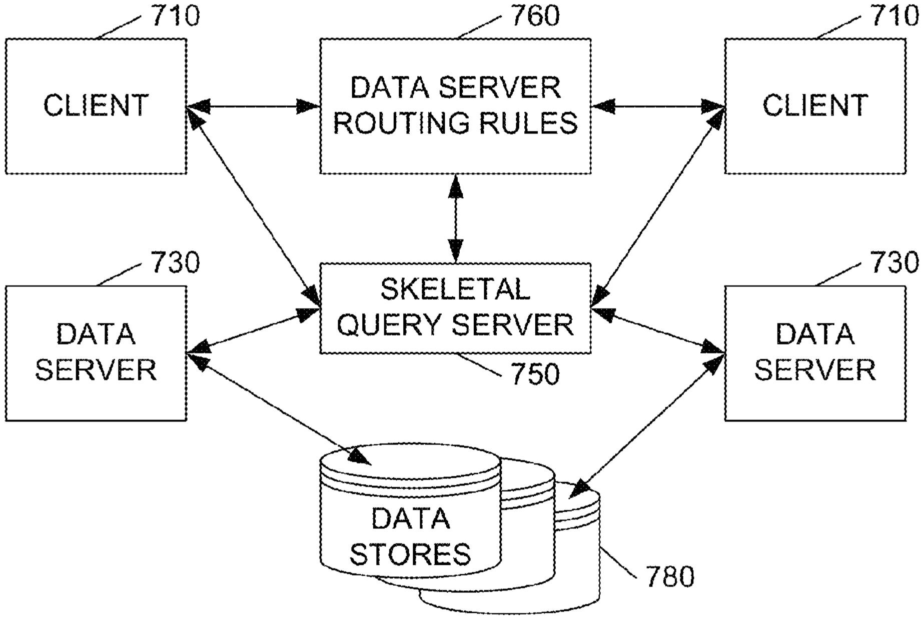

FIGS. 7A-7B illustrate example block diagrams of a database management system with distributed data servers. Multiple data servers are often used to provide load-balancing for access to large databases. For example, each data server may be configured to handle requests to a particular area of the database. If the database contains addresses of customers, for example, different data servers may be used to access records associated with different states; if the database contains ID numbers of individuals or objects, different data servers may be used for different groups of individuals or objects, distinguished by the initial digits of the ID number. In a relational database, different data servers may be used for accessing different groups of tables, and so on.

FIG. 7A illustrates three client systems 710, three routers 720, and five data servers 730. One of skill in the art will recognize that the relative number of clients, routers, and data servers are immaterial to the principles of this invention. As illustrated in FIG. 7B, the client systems 710, as well as data servers 730, may be coupled to skeletal query server to facilitate distributed access to compiled copies of skeletal queries, as detailed further below.

The particular distribution of functions among the clients 710, routers 720, and data servers 730 may vary, based on the availability of resources at each locale, and the particular system architecture. In any event, the client system 710 submits a query, and the router 720 directs a processed form of the query to one or more of the data servers to retrieve the requested information from the identified database, or plurality of databases (not illustrated in FIG. 7A). In the example of FIGS. 7A-7B, each data server 730 includes a collection of compiled skeletal queries that may be executed by that particular data server 730.

The interaction of the clients 710 and the skeletal query server 750 of FIG. 7B is similar to the interaction disclosed above with regard to the server cache 450 of FIGS. 4-6. The client 710 parses the current query to identify a skeletal query form with parameterized arguments. As contrast to the server cache 450 of FIGS. 4-6, wherein the compiled skeletal query to the requesting client, the skeletal query server 750 of FIG. 7B is configured to provide the compiled skeletal query to one or more of the data servers 730, for execution at that server on demand.

The skeletal query server 750 is aware of which skeletal query forms have been compiled, and on which data servers the compiled queries are available. If the query server 750 indicates that a compiled skeletal query is not available for the current query form, a complied skeletal query is created, typically by the client 710, or the server 750. If the query server 750 indicates that the compiled skeletal query is available, but not yet installed on the particular data server 730, the compiled skeletal query is installed on the data server 730.

As noted above, some or all of the data servers 730 may be configured to process a select subset of queries, typically to facilitate load balancing, to provide a particular quality of service to particular types of queries, and so on. For example, different data servers 730 may be used to satisfy queries from different groups of user IDs. In such an arrangement of data servers, the routing of a current query to a particular data server 730 will be dependent upon the parameters of the current query.

As illustrated in FIG. 7B, a set of "routing rules" 760 may be defined to facilitate the implementation of an assignment of particular data servers 730 to satisfy particular queries, based on one or more parameters associated with the particular query. Depending upon the particular implementation, the rules may be inclusive, exclusive, or a combination of both. Rules may include, for example:

If ID<10000, use DS1.

If ID≥10000 and ID≤20000, use any of DS2-DS4.

If ID>20000, use DS5.

If Status .NE. "married", use DS6.

Figures 8, 9:
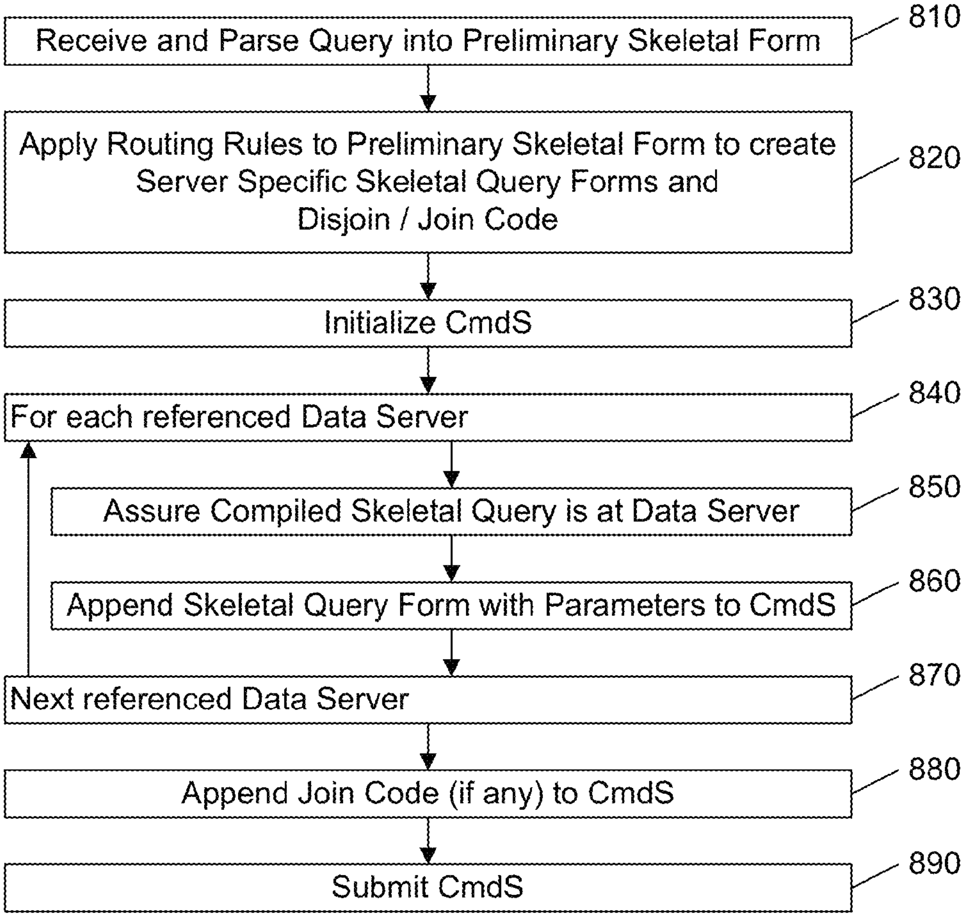
FIG. 8 illustrates an example flow diagram for executing compiled skeletal queries in a distributed query system with multiple data servers.
FIG. 9 illustrates an example data structure for identifying the routing of queries in a distributed query system with multiple data servers.

FIG. 8 illustrates an example flow diagram for defining and providing compiled skeletal queries to select data servers, based on content of a particular query. At 810, the submitted query is parsed into skeletal query form, with argumented and non-argumented parameters, as detailed above with regard to FIG. 3. At 820, the parameters of the skeletal query form is assessed to determine whether any of the routing rules apply.

For example, if the skeletal query form includes the parameter "ID", as either a value set that is passed as an argument to the compiled skeletal query, or a value set that is embedded within the compiled skeletal query, and the above example rules are in effect, the value set for the parameter "ID" in the current query is assessed to determine which data servers are to be used to service this request. If the query, for example, is "Select * from stock where ID in (1-1999)", then the query should be routed to DS1 ("If ID<10000, use DS1", above.).

If, on the other hand, the query is "Select * from stock where ID in (5000-14999)", then the query should be routed to DS1 for retrieving the records for ID in (5000-9999), and any one of DS2, DS3, or DS4 for retrieving the records for ID in (10000-14999). This partitioning of a query into separate queries that are submitted to different data servers is termed "disjoining" When the results from all of the separate queries are received, the results are "joined" so as to provide the same overall result that a single submission of the original query would have provided. That is, the fact that the original query is segregated into multiple queries for execution on multiple data servers is transparent to the client.

In accordance with aspects of this invention, instead of providing multiple copies of the current query to corresponding data servers, each accessed data server is provided a compiled skeletal query with argumented and non-argumented parameters, and multiple skeletal query forms, with appropriate parameter values corresponding to the current query, are provided for routing to the corresponding data servers. That is, the current query is parsed at 810 and 820 to determine a sequence of commands that are submitted to the query processing system (routers and data servers) in lieu of the original query. These commands include, for example, "calls" to compiled skeletal queries, with appropriate parameter values, in lieu of the convention submission of the query in its original form. In this manner, each data server does not consume the overhead that is conventionally required to interpret and execute each query as it arrives.

At 830, the sequence of commands (CmdS) that are to be submitted to the query system in lieu of the original query is initialized. If there are any commands that are required to prepare the data servers or routers for the follow-on calls to the compiled skeletal queries at the data server, or if there are any initial commands that are required to effect the disjoining process, other than the submission of the individual, disjoint, skeletal query forms, they are provided here.

The parsing at 820 will generally identify one or more data servers to which commands are routed to satisfy the current query; if not, a default data server will be identified. The loop 840-870 processes the commands that are to be submitted to each identified data server. For ease of understanding, it is assumed for this example that the original query will be parsed to identify a single skeletal query form for execution at each identified data server. If multiple skeletal query forms are created, the steps 850-860 will be repeated for each of these different skeletal query forms.

At 850, it is assured that the compiled skeletal query corresponding to the current skeletal query form is available on the currently identified data server, using techniques detailed above. For example, if the compiled skeletal query exists, but is not at the identified data server, the skeletal query server 750 of FIG. 7 provides a copy of the compiled skeletal query to the data server, or identifies to the data server where the compiled skeletal query may be found. If the compiled skeletal query does not yet exist, the corresponding skeletal query code will be created and compiled by either a client 710, a data server 730, or a query server 750 and provided to the identified data server.

At 860, the command corresponding to the skeletal query form, with argumented parameters, is created and appended to the command sequence. As noted above, this command is typically in the form of a subroutine call, with the current values of the argumented parameters passed as an array of values.

It should be noted that the principles of this invention do not require that all queries must be transformed into skeletal query forms with corresponding compiled skeletal queries. If a compiled skeletal query is not available, or for some reason not available on a particular data server, the original query may be placed in the command sequence. When the query processor receives the original query in the command sequence, it merely interprets and executes the query in the conventional manner.

After all of the identified data servers are processed, at 870, the command sequence is terminated with any remaining tasks, at 880. In particular, if the query had been disjoined for submission to multiple data servers, commands that effect a joining or merging of the results of the individual submissions are added to the command sequence. At 890, the command sequence is forwarded to the query processing system (routers 720 and data servers 730 of FIG. 7) for execution.

The conventional router 720 assesses each query to determine which data server, or plurality of data servers, are to receive the current query, based on the values of the parameters of the current query. One of skill in the art will recognize that the parsing at 820 of FIG. 8 performs the same task. Accordingly, in some embodiments of this invention, the command sequence that is submitted to the router may include 'meta-data' that identifies the intended data server to the router. If the router is configured to recognize this meta-data, it need not assess each command in the command stream to determine the data server to which the command is to be sent.

FIG. 9 illustrates an example data structure that facilitates the segregation of skeletal query forms for execution at particular data servers, based on values of parameters associated with the current query. At 910, the skeletal query forms are identified, as well as an identifier of a 'key' parameter 920 within the skeletal query form that may determine which data server is to handle the query. At 930, a partitioning of a key parameter's value space is identified, and at 940, the data server that is assigned to handle each partition is identified.

In this example data structure, the entries are similar to entries that might be created corresponding to the example routing rules presented above with regard to FIGS. 7B and 8. The skeletal query forms 911 (S1, S2, S7, S19 and S23) include "ID" as a key parameter 921 that determines where the query will be executed, based on the value, or range of values, of this parameter in the particular query. If the ID value in a query is less than 10000 (931*a*), the query will be routed to data server DS1 (941*a*); if the ID value is between 10000 and 20000 (931*b*), the query will be routed to any of data servers DS2, DS3, or DS4 (941*b*). If the ID value in a query is above 20000 (931*c*), the query will be routed to data server DS5 (941*c*).

Skeletal query forms 912 (S5, S6, S9, and S13) include a parameter "Status" ("St") whose value in a query determines where to execute the query. If the Status value is not "married", the query should be routed to data server DS6 (942*a*); otherwise if the Status value is "married", any of a set of uncommitted data servers DS7, DS8, and DS9 (942*b*) may be used to execute the query.

Skeletal query forms 913 (S3, S4, and S8) do not include a parameter whose value in the query determines where the query will be executed. In this example, the aforementioned uncommitted data servers DS7, DS8, and DS9 (942) are identified for processing these queries.

The entries 920, 930, 940 in the table of FIG. 9 may be created before queries are processed, based on the data server routing rules, with a null list of skeletal query forms 910 associated with these routing rules.

When a new query is parsed to identify the corresponding skeletal query form, the table of FIG. 9 is searched to determine whether the skeletal query form is include as an identified skeletal query form 910. If so, the key parameter 920 is obtained from the table, and the value or range of values of this key parameter in the new query is assessed to determine which partition(s) of the value space the current query values include. Based on these identified partitions 930, the data server(s) to which the query is to be routed is/are identified.

If the skeletal query form is not a currently identified query form 910, the parameters of the current skeletal query form are assessed to determine whether they match any of the identified key parameters 920. If a matching key parameter is found, the current query form is added to the list of query forms 910 that are routed based on this key parameter, and the data server(s) to which the query is/are to be routed are identified based on the value of this key parameter in the current query.

One of skill in the art will recognize that alternative schemes may be used for determining whether a given query is to be routed to one or more particular data servers. For example, the list of skeletal query forms 910 may be omitted from the table of FIG. 9. In this embodiment, the parameters of the current skeletal query form are assessed to determine whether any of them match a key parameter 920. If a match is found, the data server(s) to which the query is/are to be routed are identified based on the value of this key parameter in the current query. If a match is not found, a data server is selected from among a set of available data servers. In another embodiment, a hash of the skeletal query form may be used to identify a particular routing test, if any, that is to be applied to a key parameter of the query to determine the appropriate routing of the query.

The foregoing merely illustrates the principles of the invention. It will thus be appreciated that those skilled in the art will be able to devise various arrangements which, although not explicitly described or shown herein, embody the principles of the invention and are thus within its spirit and scope. For example, although a discrete server cache 450 is referenced in the above disclosure, one of skill in the art will recognize that a distributed server cache may also be provided. For example, using the example of a server cache that provides the location of compiled code, rather than the actual code, the list of locations such as illustrated in FIG. 5 may be maintained at each client 410. In an example embodiment, each client 410 includes a list of skeleton query forms and corresponding locations, and as each client 410 creates a new skeleton query form and corresponding compiled code, the client broadcasts the new skeleton query form and the location of the corresponding compiled code to all of the other clients, thereby creating a server cache that is present at each of the clients.

In like manner, one of skill in the art will recognize that other techniques may be used to select the target database server for executing the skeletal query form. For example, in conjunction with, or independent of a selection based on a value of a parameter in the query, the routers 720, or the server cache 450 may be configured to select the database server for executing each query based on the load and/or the response time at each database server.

These and other system configuration and optimization features will be evident to one of ordinary skill in the art in view of this disclosure, and are included within the scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of a combination of hardware portions (e.g., including discrete and integrated electronic circuitry) and software portions (e.g., computer programming).

f) hardware portions may include a processor, and software portions may be stored on a non-transitory computer-readable medium, and may be configured to cause the processor to perform some or all of the functions of one or more of the disclosed elements;

g) hardware portions may be comprised of one or both of analog and digital portions;

h) any of the disclosed devices or portions thereof may be combined together or separated into further portions unless specifically stated otherwise;

i) no specific sequence of acts is intended to be required unless specifically indicated; and j) the term "plurality of" an element includes two or more of the claimed element, and does not imply any particular range of number of elements; that is, a plurality of elements can be as few as two elements, and can include an immeasurable number of elements.

We claim:

1. A method comprising:

receiving, at a processing system that includes a processor and memory, a user query for selecting data from a database that is accessible via a plurality of database servers;

parsing, by the processing system, the user query to identify a skeletal query form corresponding to the user query and one or more arguments associated with the user query, and to identify a target database server among the plurality of database servers based on the skeletal query form and the one or more arguments;

determining, by the processing system, whether a compiled skeletal query corresponding to the identified skeletal query form is available at the target database server, the compiled skeletal query including machine code that is executable directly by the processing system, and, if the compiled skeletal query is available at the target database server:

communicating, by the processing system, the user query and one or more arguments associated with the user query to the target database server;

retrieving, by the target database server, the machine code corresponding to the compiled skeletal query from a database;

executing, by the target database server, the machine code using the one or more arguments associated with the user query; and providing, from the target database server, results of the executing of the machine code in response to the user query; and if the compiled skeletal query is not available at the target database server:

providing the compiled skeletal query to the target database server.

2. The method of claim 1, including creating the compiled skeletal query corresponding to the identified skeletal query form.

3. The method of claim 1, including a query server that identifies where each of a plurality of compiled skeletal queries are located, and determining whether the compiled skeletal query is available at the target database server includes querying the query server.

4. The method of claim 3, wherein the query server includes server storage for storing some or all of the plurality of compiled skeletal queries.

5. The method of claim 3, wherein the query server is in communication with a plurality of clients, and each of the plurality of compiled skeletal queries is made available to each of the plurality of clients.

6. The method of claim 5, wherein the plurality of clients are configured to create compiled skeletal queries corresponding to identified skeletal query forms, and provide access to the compiled skeletal queries to the query server.

7. The method of claim 1, wherein the target database server is selected from among the plurality of database servers based on a value of a parameter of records of the database, and the identifying of the target database server based on the skeletal query form and the one or more arguments includes identifying a given value of the parameter in the user query.

8. The method of claim 1, wherein the user query includes a search of the database for records having a parameter value equal to one or more user identified values, and the one or more arguments of the user query include the one or more user identified values.

9. The method of claim 1, wherein the user query conforms to a Structured Query Language (SQL) query.

10. A non-transitory computer-readable medium that includes a computer program, which, when executed by a processing system at a client causes the processing system to:

- receive a user query for selecting data from a database that is accessible via a plurality of database servers;
- parse the user query to identify a skeletal query form corresponding to the user query and one or more arguments associated with the user query, and to identify a target database server among the plurality of database servers based on the skeletal query form and the one or more arguments;
- determine whether a compiled skeletal query corresponding to the identified skeletal query form is available at the target database server, the compiled skeletal query including machine code that is executable directly by the processing system, and,
- if the compiled skeletal query is available at the target database server:
  - communicate the user query and one or more arguments associated with the user query to the target database server;
  - receiving results of executing machine code corresponding to the compiled skeletal query at the database server using the one or more arguments associated with the user query; and
  - providing the results in response to the user query; and
- if the compiled skeletal query is not available at the target database server:
- provide the compiled skeletal query to the target database server.

11. The medium of claim 10, wherein the computer program causes the processing system to provide the compiled skeletal query to the target database server by directing a query server to provide the compiled skeletal query to the target database server.

12. The medium of claim 10, wherein the computer program causes the processing system to create the compiled skeletal query corresponding to the identified skeletal query form.

13. The medium of claim 12, wherein the computer program causes the processing system to create the compiled skeletal query by directing a query server to create the compiled skeletal query.

14. The medium of claim 10, wherein the computer program causes the processing system to determine whether the compiled skeletal query is available at the target database server by querying a query server that identifies where each of a plurality of compiled skeletal queries are located.

15. The medium of claim 10, wherein the target database server is selected from among the plurality of database servers based on a value of a parameter of records of the database, and the computer program causes the processing system to identify the target database server based on the skeletal query form and the one or more arguments by identifying a given value of the parameter in the user query.

16. The medium of claim 10, wherein the user query includes a search of the database for records having a parameter value equal to one or more user identified values, and the one or more arguments of the user query include the one or more user identified values.

17. The medium of claim 10, wherein the user query conforms to a Structured Query Language (SQL) query.

18. A system comprising:

- one or more clients, and
- a plurality of database servers that provide access to records of a database;
- wherein:
- each client includes:
  - a query parser that parses a user query to identify a skeletal query form corresponding to the user query and one or more arguments associated with the user query, and identifies a target database server among the plurality of database servers based on the skeletal query form and the one or more arguments;
- determine whether a compiled skeletal query corresponding to the identified skeletal query form is available at the target database server, the compiled skeletal query including machine code that is executable directly by the processing system, and,
- if the compiled skeletal query is available at the target database server:
  - communicate the user query and one or more arguments associated with the user query to the target database server;
  - receiving results of executing machine code corresponding to the compiled skeletal query at the database server using the one or more arguments associated with the user query; and providing the results in response to the user query; and
- if the compiled skeletal query is not available at the target database server:
- provide the compiled skeletal query to the target database server.

19. The system of claim 18, wherein the query parser identifies the target database server based on a value of one of the arguments.

20. The system of claim 18, wherein the client determines whether the compiled skeletal query is available at the target database server, and, if the compiled skeletal query is not available at the target database server, provides the compiled skeletal query to the target database server.

21. The system of claim 20, including a query server, and wherein the client determines whether the compiled skeletal query is available at the target database server by querying the query server.

22. The system of claim 21, wherein the query server creates the compiled skeletal query based on the skeletal query form and the one or more arguments associated with the user query.

23. The system of claim 20, wherein the client creates the compiled skeletal query based on the skeletal query form and the one or more arguments associated with the user query.

24. The system of claim 18, including a query server, and wherein the client determines whether the compiled skeletal query is available at the target database server by querying the query server.

25. The system of claim 24, wherein each client provides the query server access to compiled skeletal queries created in response to receiving a user query that does not correspond to an existing skeletal query form.

26. The system of claim 18, wherein the user query includes a search of the database for records having a parameter value equal to one or more user identified values, and the one or more arguments of the user query include the one or more user identified values.

27. The system of claim 18, wherein the user query conforms to a Structured Query Language (SQL) query.

28. The system of claim 18, wherein:

the query parser identifies a plurality of target database servers for executing a plurality of corresponding compiled skeletal queries corresponding to the user query, each of the plurality of target database servers executes the corresponding compiled skeletal and provides results to the client, and the client combines the results from the plurality of target database servers to provide a unified result in response to the user query.

* * * * *